(12) United States Patent
Vargas

(10) Patent No.: US 9,933,259 B1
(45) Date of Patent: Apr. 3, 2018

(54) ORTHOGONALLY-ALIGNED LEVEL TOOL

(71) Applicant: Laester Vargas, Saugas, MA (US)

(72) Inventor: Laester Vargas, Saugas, MA (US)

(*) Notice: Subject to any disclaimer, the term of this patent is extended or adjusted under 35 U.S.C. 154(b) by 137 days.

(21) Appl. No.: 15/077,414

(22) Filed: Mar. 22, 2016

(51) Int. Cl.
G01C 9/34 (2006.01)
G01C 9/26 (2006.01)

(52) U.S. Cl.
CPC ........ G01C 9/34 (2013.01); G01C 9/26 (2013.01)

(58) Field of Classification Search
CPC ................................. G01C 9/26; G01C 9/34
USPC ......... 33/347, 365, 374, 379, 381, 385, 451, 33/452
See application file for complete search history.

(56) References Cited

U.S. PATENT DOCUMENTS

| | | | | |
|---|---|---|---|---|
| 747,850 A * | 12/1903 | Bihlman | ............... | G01C 9/24 33/376 |
| 2,559,961 A * | 7/1951 | Howell | ............... | F16C 1/04 33/374 |
| 2,789,363 A * | 4/1957 | Miley | ............... | G01C 9/24 248/206.5 |
| 2,857,678 A * | 10/1958 | Armour, Jr. | ......... | E04G 21/1808 33/343 |
| 3,104,477 A * | 9/1963 | Edwill | ............... | G01C 9/28 33/374 |
| 3,296,708 A * | 1/1967 | Moody | ............... | G01C 9/24 33/371 |
| 4,531,301 A * | 7/1985 | Tau | ............... | G01C 9/28 33/382 |
| 4,607,437 A * | 8/1986 | McSorley, Sr. | ......... | G01C 9/28 33/374 |
| 4,894,925 A * | 1/1990 | Langmaid | ............. | G01C 9/28 33/374 |
| 4,928,395 A | 5/1990 | Good | | |
| 5,412,875 A | 5/1995 | Hilderbrandt | | |
| 5,433,011 A * | 7/1995 | Scarborough | ............ | G01C 9/28 33/374 |
| 5,519,942 A * | 5/1996 | Webb | ............... | G01C 9/28 33/281 |
| 5,577,327 A * | 11/1996 | Archambault | .......... | G01C 9/28 33/374 |
| 5,604,987 A * | 2/1997 | Cupp | ............... | G01C 15/008 33/275 R |
| 5,617,641 A | 4/1997 | Aarhua | | |
| 6,047,478 A * | 4/2000 | Sowers | ............... | G01C 9/26 33/374 |

(Continued)

Primary Examiner — R. A. Smith
Assistant Examiner — Tania Courson
(74) Attorney, Agent, or Firm — Kyle A. Fletcher, Esq.

(57) ABSTRACT

The orthogonally aligned level tool comprises a plurality of bubble levels that measure the level of measured surfaces near walls and corners. The orthogonally aligned level tool comprises a central component, a first wing, and a second wing. The first wing and the central component are connected using a first telescopic shaft. The first telescopic shaft allows for a physical separation of distance between the first wing and the central component which allows for the level measurement of a larger surface than can be measured by a traditional level. The second wing and the central component are connected using a second telescopic shaft. The second telescopic shaft allows for a physical separation of distance between the second wing and the central component which allows for the level measurement of a larger surface than can be measured by a traditional level.

9 Claims, 5 Drawing Sheets

(56) References Cited

U.S. PATENT DOCUMENTS

| | | | |
|---|---|---|---|
| 6,209,211 B1* | 4/2001 | Szumer | G01C 9/28 33/382 |
| 6,279,240 B1 | 8/2001 | Bonaventura, Jr. | |
| 6,293,023 B1 | 9/2001 | Schooley | |
| 6,453,568 B1* | 9/2002 | Hymer | G01C 15/008 33/276 |
| 6,796,045 B2* | 9/2004 | Hallee | G01C 9/28 33/370 |
| 6,836,973 B1* | 1/2005 | Eccles, Jr. | G01C 9/28 33/374 |
| 6,918,187 B2* | 7/2005 | Schaefer | G01C 9/26 33/365 |
| 7,281,335 B2* | 10/2007 | Feliciano | G01C 9/26 33/374 |
| 7,497,022 B1* | 3/2009 | Aarhus | G01C 9/26 33/374 |
| 7,963,044 B1* | 6/2011 | Bartholomew | G01C 9/26 33/374 |
| 8,336,221 B2* | 12/2012 | Steele | G01C 9/28 33/354 |
| 8,413,343 B2 | 4/2013 | Hale | |
| 9,546,867 B2* | 1/2017 | Lueck | G01C 9/28 |
| 2001/0049879 A1* | 12/2001 | Moore, Jr. | G01C 15/008 33/376 |
| 2006/0101661 A1* | 5/2006 | Schmidt | A47G 1/205 33/613 |

* cited by examiner

ORTHOGONALLY-ALIGNED LEVEL TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of measuring distances, levels, or bearings, more specifically, an orthogonally aligned tool configured for use in corner level measurements.

SUMMARY OF INVENTION

The orthogonally aligned level tool measures the level of measured surfaces near walls and corners. The orthogonally aligned level tool comprises a central component, a first wing, and a second wing. The central component further comprises a third plurality of bubble levels, also referred to as spirit levels, which can be used to determine the level of the measured surface. The first wing further comprises a first plurality of bubble levels that can be used to determine the level of the measured surface. The second wing further comprises a second plurality of bubble levels that can be used to determine the level of the measured surface. The first wing and the central component are connected using a first telescopic shaft. The first telescopic shaft allows for a physical separation of distance between the first wing and the central component, which allows for the level measurement of a larger surface than can be measured via a traditional level. The second wing and the central component are connected using a second telescopic shaft. The second telescopic shaft allows for a physical separation of distance between the second wing and the central component, which allows for the level measurement of a larger surface than can be measured via a traditional level.

These together with additional objects, features and advantages of the orthogonally aligned level tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the orthogonally aligned level tool in detail, it is to be understood that the orthogonally aligned level tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the orthogonally aligned level tool.

It is therefore important that the claims be regarded as including such equivalent construction insofar as they do not depart from the spirit and scope of the orthogonally aligned level tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
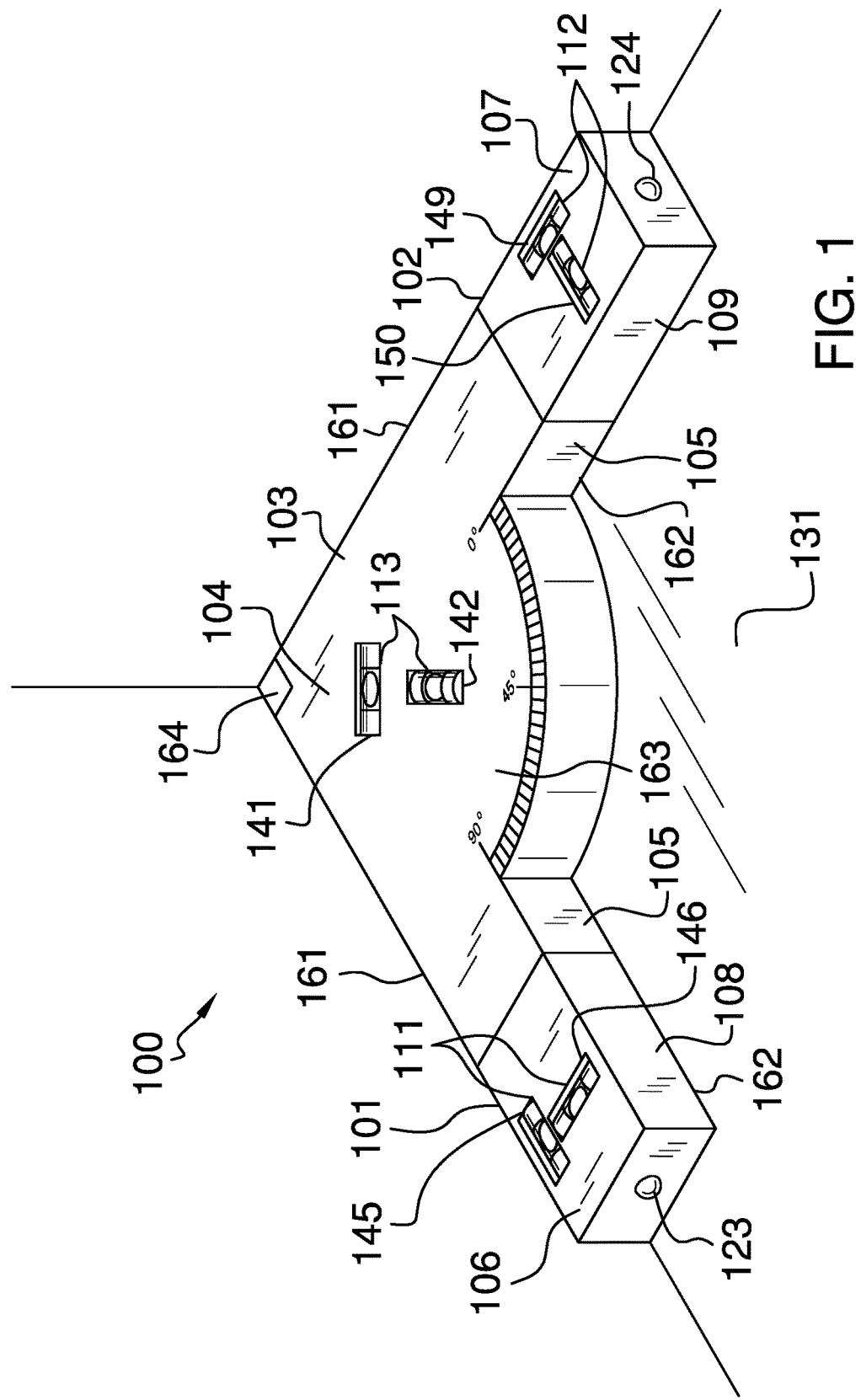
FIG. 1 is a top perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a plurality of potential embodiment of the disclosures, which are illustrated in FIGS. 1 through 6.

The orthogonally aligned level tool 100 (hereinafter invention) comprises a central component 103, a first wing 101, and a second wing 102. The invention 100 measures the level of measured surfaces 131 near walls and corners. The central component 103 further comprises a third plurality of bubble levels 113, also referred to as spirit levels that can be used to determine the level of the measured surface 131. The first wing 101 further comprises a first plurality of bubble levels 111 that can be used to determine the level of the measured surface 131. The second wing 102 further comprises a second plurality of bubble levels 112 that can be used to determine the level of the measured surface 131. The first wing 101 and the central component 103 are connected using a first telescopic shaft 121. The first telescopic shaft 121 allows for a physical separation of distance between the first wing 101 and the central component 103, which allows for the level measurement of a larger measured surface 131 area than can be measured by a traditional level.

The second wing 102 and the central component 103 are connected using a second telescopic shaft 122. The second telescopic shaft 122 allows for a physical separation of distance between the second wing 102 and the central component 103, which allows for the level measurement of a larger measured surface 131 than can be measured by a traditional level.

The central component 103 is a structure upon which the third plurality of bubble levels 113 are mounted. The form and shape of the central component 103 will vary to accommodate various usage scenarios. Variations in the form and shape of the central component 103 represent different potential embodiments of the disclosure. All variations of the central component 103 will further comprise one or more parallel surfaces 104 and one or more perpendicular surfaces 105. Each of the one or more parallel surfaces 104 is a planar surface presented by the central component 103 that is parallel to the measured surface 131 that is measured when the invention 100 is used normally. Each of the one or more perpendicular surfaces 105 is a planar surface presented by the central component 103 that is perpendicular to the measured surface 131 that is measured when the invention 100 is used normally. A third magnet 116 attaches to the central component 103 such that the central component 103 can be fixed into in position with a magnet or a metal plate.

Each of the third plurality of bubble levels 113 is a commercially available bubble level that is used to measure the angle of the invention 100 to the measured surface 131. In the first potential embodiment of the disclosure, as shown most clearly in FIG. 1, the third plurality of bubble levels 113 further comprises a first bubble level 141 and a second bubble level 142. The first bubble level 141 and the second bubble level 142 mount on a parallel surface selected from the one or more parallel surfaces 104 such that the first bubble level 141 is orthogonal to the second bubble level 142. The orthogonal positioning between the first bubble level 141 and the second bubble level 142 provides mounting surface 131 level information in two dimensions allowing more for more accurate adjustments when leveling a mounting surface 131.

Figure 4:
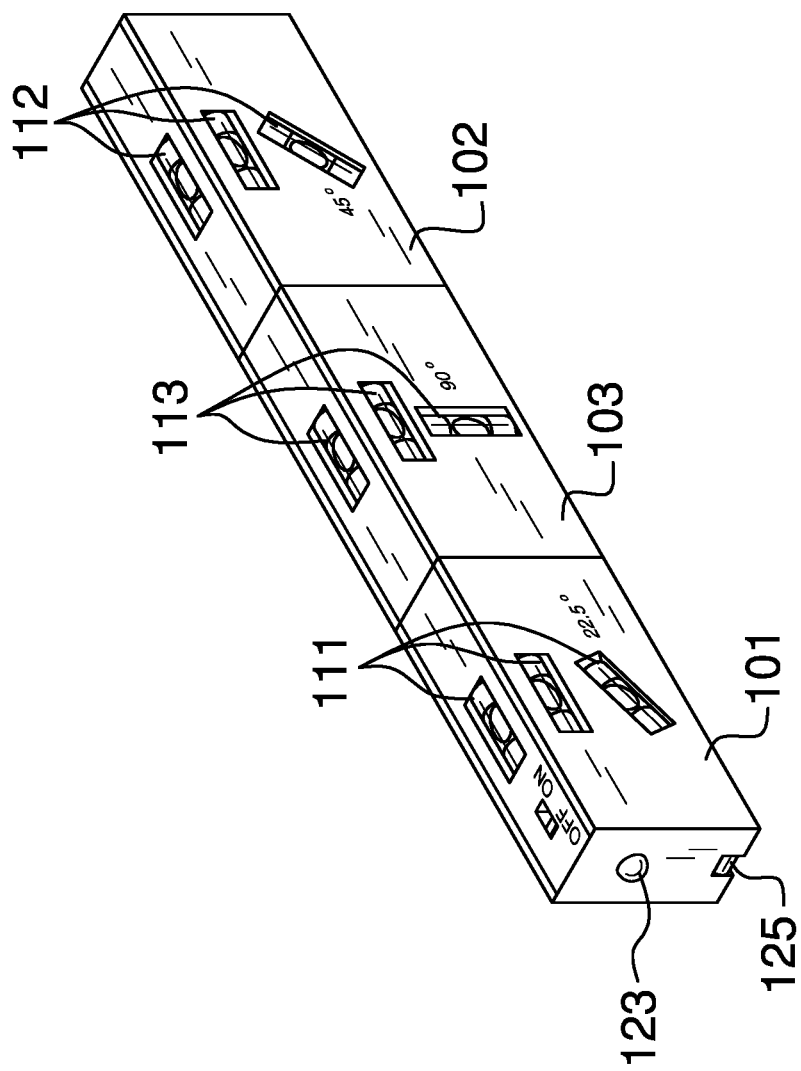
FIG. 4 is a perspective view of an alternate embodiment of the disclosure.

In the second potential embodiment of the disclosure, as most clearly shown in FIG. 4, the third plurality of bubble levels 113 further comprises a third bubble level 143. The third bubble level 143 mounts on a perpendicular surface selected from the one or more perpendicular surfaces 105. In a third potential embodiment of the disclosure, as shown most clearly in FIG. 5, the third plurality of bubble levels 113 further comprises a fourth bubble level 144. The fourth bubble level 144 is mounted at a third relative angle 119 relative to the third bubble level 143. The third relative angle 119 is selected such that designed inclines in the measured surface 131 can be readily measured.

The first wing 101 is formed in the shape of a rectangular block. The first wing 101 further comprises at least one first wing parallel surface 106 that is parallel to the one or more parallel surfaces 104. The first wing 101 further comprises at least one first wing perpendicular surface 108 that is parallel to the one or more perpendicular surfaces 105. As shown most clearly in FIGS. 1 and 5, the first wing 101 is further formed with a first hook 125 that can be used to hook the first wing 101 to a wall corner such that the first hook 125 will hold the invention 100 in position. The first hook 125 is attached to the first wing 101 using a pivot that allows the first hook 125 to rotate into and out of a first cavity 127 that is formed in the first wing 101. A first magnet 114 attaches to the first wing 101 such that the first wing 101 can be fixed into a position with a magnet or a metal plate. A first laser 123 is attached to the first wing 101. The first laser 123 projects a fixed laser beam in a direction parallel to the measured surface 131 that can be used as a level reference.

Each of the first plurality of bubble levels 111 is a commercially available bubble level that is used to measure the angle of the invention 100 to the measured surface 131. In the first potential embodiment of the disclosure, as shown most clearly in FIG. 1, the first plurality of bubble levels 111 further comprises a fifth bubble level 145 and a sixth bubble level 146. The fifth bubble level 145 and the sixth bubble level 146 mount on the first wing parallel surface 106 such that the fifth bubble level 145 is orthogonal to the sixth bubble level 146. The orthogonal positioning between the fifth bubble level 145 and the sixth bubble level 146 provides mounting surface 131 level information in two dimensions allowing more for more accurate adjustments when leveling a mounting surface 131.

In the second potential embodiment of the disclosure, as most clearly shown in FIG. 4, the first plurality of bubble levels 111 further comprises a seventh bubble level 147. The seventh bubble level 147 mounts on the first wing perpendicular surface 108. In a third potential embodiment of the disclosure, as shown most clearly in FIG. 5, the first plurality of bubble levels 111 further comprises an eighth bubble level 148. The eighth bubble level 148 is mounted on the first wing perpendicular surface 108 at a first relative angle 117 to the seventh bubble level 147. The first relative angle 117 is selected such that designed inclines in the measured surface 131 can be readily measured.

The second wing 102 is formed in the shape of a rectangular block. The second wing 102 further comprises at least one, second wing parallel surface 107 that is parallel to the one or more parallel surfaces 104. The second wing 102 further comprises at least one, second wing perpendicular surface 109 that is parallel to the one or more perpendicular surfaces 105. As shown most clearly in FIGS. 1 and 5, the second wing 102 is further formed with a second hook 126 that can be used to hook the second wing 102 to a wall corner such that the second hook 126 will hold the invention 100 in position. The second hook 126 is attached to the second wing 102 using a pivot that allows the second hook 126 to rotate into and out of a second cavity 128 that is formed in the second wing 102. A second magnet 115 attaches to the second wing 102 such that the second wing 102 can be fixed into a position with a magnet or a metal plate. A second laser 124 is attached to the second wing 102. The second laser 124 projects a fixed laser beam in a direction parallel to the measured surface 131 that can be used as a level reference.

Each of the second plurality of bubble levels 112 is a commercially available bubble level that is used to measure the angle of the invention 100 to the measured surface 131. In the first potential embodiment of the disclosure, as shown most clearly in FIG. 1, the second plurality of bubble levels 112 further comprises a ninth bubble level 149 and a tenth bubble level 150. The ninth bubble level 149 and the tenth bubble level 150 mount on the second wing parallel surface 107 such that the ninth bubble level 149 is orthogonal to the tenth bubble level 150. The orthogonal positioning between the ninth bubble level 149 and the tenth bubble level 150 provides mounting surface 131 level information in two dimensions allowing more for more accurate adjustments when leveling a mounting surface 131.

In the second potential embodiment of the disclosure, as most clearly shown in FIG. 4, the second plurality of bubble levels 112 further comprises an eleventh bubble level 151. The eleventh bubble level 151 mounts on the second wing perpendicular surface 109. In a third potential embodiment of the disclosure, as shown most clearly in FIG. 5, the second plurality of bubble levels 112 further comprises a twelfth bubble level 152. The twelfth bubble level 152 is mounted on the second wing perpendicular surface 109 at a second relative angle 118 to the eleventh bubble level 151. The second relative angle 118 is selected such that designed inclines in the measured surface 131 can be readily measured.

In all potential embodiments of the disclosure, the first telescopic shaft 121 attaches the first wing 101 to the central component 103. The first telescopic shaft 121 is a telescopic shaft that is mounted within the first wing 101 and the central component 103 such that the first wing 101 and the central component 103 can be pushed together to minimize the span between first wing 101 and the central component 103. The mounting of the first telescopic shaft 121 will also allow the first wing 101 and the central component 103 to be separated by distance along a fixed single direction defined by the center axis of the first telescopic shaft 121. In all potential embodiments of the disclosure, the second telescopic shaft 122 attaches the second wing 102 to the central component 103. The second telescopic shaft 122 is a telescopic shaft that is mounted within the second wing 102 and the central component 103 such that the second wing 102 and the central component 103 can be pushed together to minimize the span between second wing 102 and the central component 103. The mounting of the second telescopic shaft 122 will also allow the second wing 102 and the central component 103 to be separated by distance along a fixed single direction defined by the center axis of the second wing 102.

Figure 5:
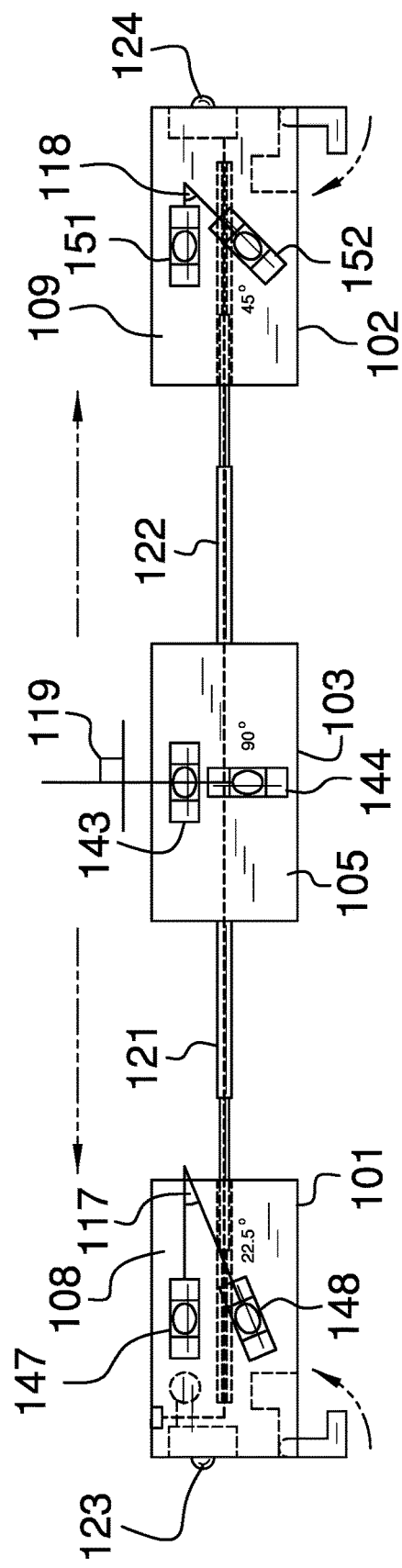
FIG. 5 is a side view of an alternate embodiment of the disclosure.
Figure 6:
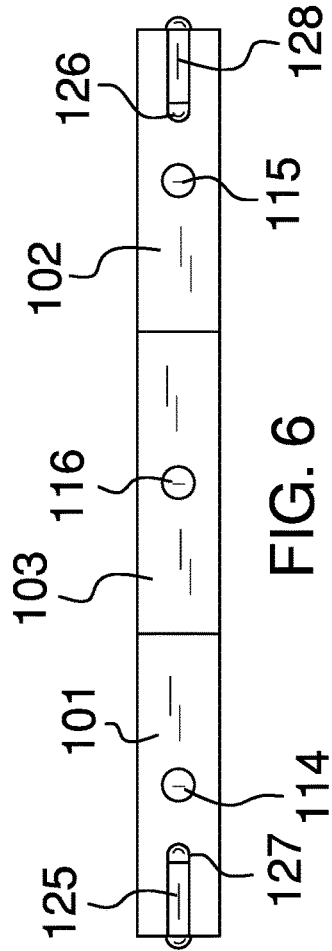
FIG. 6 is a bottom view of an alternate embodiment of the disclosure.

As shown in FIGS. 4 through 6, a fourth potential embodiment of the disclosure is identical to the first potential embodiment of the disclosure with the further limitation that the central component 103 is formed in the shape of a rectangular block.

As shown in FIGS. 4 through 6, a fifth potential embodiment of the disclosure is identical to the second potential embodiment of the disclosure with the further limitation that the central component 103 is formed in the shape of a rectangular block.

As shown in FIGS. 4 through 6, a sixth potential embodiment of the disclosure is identical to the third potential embodiment of the disclosure with the further limitation that the central component 103 is formed in the shape of a rectangular block.

Figure 2:
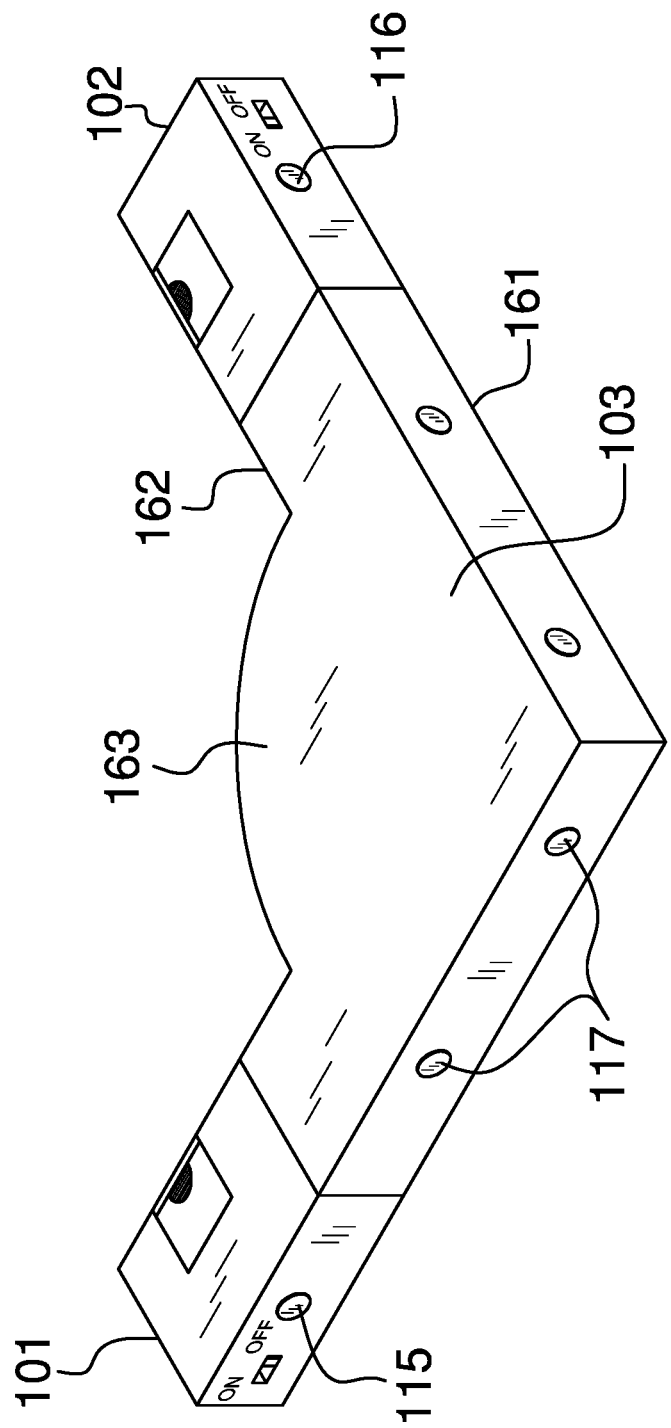
FIG. 2 is a bottom perspective view of an embodiment of the disclosure.
Figure 3:
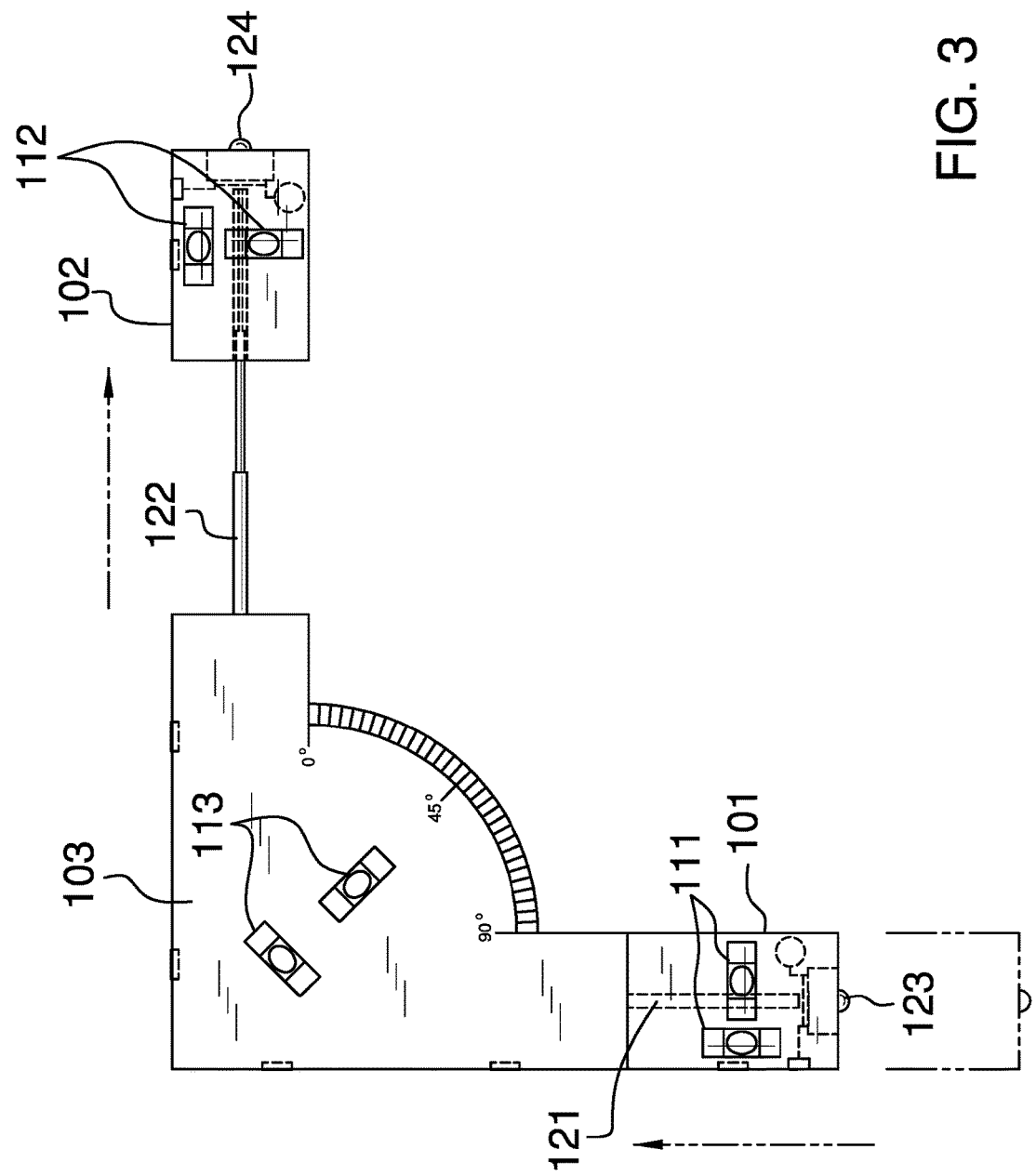
FIG. 3 is a top view of an embodiment of the disclosure.

As shown in FIGS. 1 through 3, a seventh potential embodiment of the disclosure is identical to the first potential embodiment of the disclosure with the further limitation that the central component 103 is formed in the shape of an L with a quarter-circle. Specifically, the central component 103 is formed as two rectangular shaped arms joined at a right angle 164 to form an L shape. The central component 103 is further defined with an outer edge 161 and an inner edge 162. A structure formed in the shape of a quarter circle 163 is inserted into right angle 164 formed by the inner edge 162. The quarter circle 163 is marked such that the quarter circle 163 can be used as a protractor to measure angles.

As shown in FIGS. 1 through 3, an eighth potential embodiment of the disclosure is identical to the second potential embodiment of the disclosure with the further limitation that the central component 103 is formed in the shape of an L with a quarter-circle. Specifically, the central component 103 is formed as two rectangular shaped arms joined at a right angle 164 to form an L shape. The central component 103 is further defined with an outer edge 161 and an inner edge 162. A structure formed in the shape of a quarter circle 163 is inserted into right angle 164 formed by the inner edge 162. The quarter circle 163 is marked such that the quarter circle 163 can be used as a protractor to measure angles.

As shown in FIGS. 1 through 3, a ninth potential embodiment of the disclosure is identical to the third potential embodiment of the disclosure with the further limitation that the central component 103 is formed in the shape of an L with a quarter-circle. Specifically, the central component 103 is formed as two rectangular shaped arms joined at a right angle 164 to form an L shape. The central component 103 is further defined with an outer edge 161 and an inner edge 162. A structure formed in the shape of a quarter circle 163 is inserted into right angle 164 formed by the inner edge 162. The quarter circle 163 is marked such that the quarter circle 163 can be used as a protractor to measure angles.

The invention 100 is used as a normal level would be used.

The first wing 101, second wing 102, and the third wing 103 are made from a metal or plastic design such that the first wing 101, second wing 102, and the third wing 103 will not warp or otherwise deform because of variations in environmental conditions. The first telescopic shaft 121, the second telescopic shaft 122, magnets, and bubble levels discussed in this disclosure are commercially available.

The following definitions were used in this disclosure:

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Pivot: As used in this disclosure, a pivot is a rod or shaft around which an object rotates or swings.

Telescopic: As used in this disclosure, telescopic is an adjective that describes an object made of sections that fit or slide into each other such that the object can be made longer or shorter by adjusting the relative positions of the sections.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A measurement tool comprising:
    a central component, a first wing, and a second wing;
    wherein the measuring device measures the level of a measured surface;
    wherein the measuring device is adapted for use next to walls and corners;
    wherein the first wing further comprises a first plurality of bubble levels;

wherein the second wing further comprises a second plurality of bubble levels;

wherein the central component further comprises a third plurality of bubble levels;

wherein the first wing and the central component are connected using a first telescopic shaft;

wherein the second wing and the central component are connected using a second telescopic shaft;

wherein the third plurality of bubble levels are mounted on the central component;

wherein the central component further comprises one or more parallel surfaces;

wherein the central component further comprises one or more perpendicular surfaces;

wherein the central component further comprises a first magnet;

wherein the third plurality of bubble levels further comprises a first bubble level and a second bubble level;

wherein the first bubble level and the second bubble level mount on a parallel surface selected from the one or more parallel surfaces;

wherein the first bubble level is orthogonal to the second bubble level;

wherein the third plurality of bubble levels further comprises a third bubble level;

wherein the third bubble level mounts on a perpendicular surface selected from the one or more perpendicular surfaces;

wherein the third plurality of bubble levels further comprises a fourth bubble level;

wherein the fourth bubble level mounts on the same surface as the third bubble level;

wherein the first wing is formed in the shape of a rectangular block;

wherein the second wing is formed in the shape of a rectangular block;

wherein the first wing further comprises one or more first wing parallel surfaces that are parallel to a surface selected from the one or more parallel surfaces;

wherein the second wing further comprises one or more second wing parallel surfaces that are parallel to a surface selected from the one or more parallel surfaces;

wherein the first wing further comprises one or more first wing perpendicular surfaces that are parallel to a surface selected from the one or more perpendicular surfaces;

wherein the second wing further comprises one or more second wing perpendicular surfaces that are parallel to a surface selected from the one or more perpendicular surfaces;

wherein the first wing further comprises a first hook;

wherein the second wing further comprises a second hook;

wherein the first wing further comprises a second magnet;

wherein the second wing further comprises a third magnet.

2. The measurement tool according to claim 1 wherein the first wing further comprises a first laser;

wherein the second wing further comprises a second laser.

3. The measurement tool according to claim 2 wherein the first plurality of bubble levels further comprises a fifth bubble level and a sixth bubble level;

wherein the first plurality of bubble levels further comprises a seventh bubble level;

wherein the first plurality of bubble levels further comprises an eighth bubble level;

wherein the second plurality of bubble levels further comprises a ninth bubble level and a tenth bubble level;

wherein the fifth bubble level is mounted on a surface selected from the one or more first wing parallel surfaces;

wherein the sixth bubble level is mounted on the same surface as the fifth bubble level;

wherein the ninth bubble level mounted on a surface selected a surface selected from the one or more second wing parallel surfaces;

wherein the tenth bubble level is mounted on the same surface as the ninth bubble level.

4. The measurement tool according to claim 3 wherein the fifth bubble level is orthogonal to sixth bubble level;

wherein the ninth bubble level is orthogonal a tenth bubble level.

5. The measurement tool according to claim 4 wherein the second plurality of bubble levels further comprises an eleventh bubble level;

wherein the seventh bubble level is mounted on a surface selected from the one or more first wing perpendicular surfaces;

wherein the eleventh bubble level is mounted on a surface selected from the one or more second wing perpendicular surfaces.

6. The measurement tool according to claim 5 wherein the second plurality of bubble levels further comprises a twelfth bubble level;

wherein the eighth bubble level is mounted on the same surface as the seventh bubble level;

wherein the twelfth bubble level is mounted on the same surface as the eleventh bubble level.

7. The measurement tool according to claim 6 wherein the central component is formed in the shape of a rectangular block.

8. The measurement tool according to claim 6 wherein the central component is formed in the shape of a rectangular block with a quarter-circle.

9. The measurement tool according to claim 8 wherein the quarter-circle is marked to measure angles.

\* \* \* \* \*